(12) United States Patent
Hyun et al.

(10) Patent No.: US 9,955,837 B2
(45) Date of Patent: May 1, 2018

(54) DUST COLLECTOR FOR VACUUM CLEANER

(71) Applicant: LG ELECTRONICS INC., Seoul (KR)

(72) Inventors: Kietak Hyun, Seoul (KR); Seungyeop Lee, Seoul (KR); Hyukjin Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 463 days.

(21) Appl. No.: 14/642,554

(22) Filed: Mar. 9, 2015

(65) Prior Publication Data
US 2016/0095483 A1    Apr. 7, 2016

(30) Foreign Application Priority Data

Oct. 7, 2014    (KR) .................... 10-2014-0135229

(51) Int. Cl.
*A47L 9/16* (2006.01)
*B01D 45/14* (2006.01)
*B01D 46/48* (2006.01)
*B01D 50/00* (2006.01)
(Continued)

(52) U.S. Cl.
CPC ............. *A47L 9/1641* (2013.01); *A47L 9/108* (2013.01); *A47L 9/1608* (2013.01); *A47L 9/1625* (2013.01); *A47L 9/1666* (2013.01); *A47L 9/1683* (2013.01); *B01D 45/14* (2013.01); *B01D 46/48* (2013.01); *B01D 50/002* (2013.01); *B04C 3/04* (2013.01)

(58) Field of Classification Search
CPC ............................ A47L 9/1641; A47L 9/1625
USPC ........................................................... 15/353
See application file for complete search history.

(56) References Cited

U.S. PATENT DOCUMENTS

2006/0150587 A1*  7/2006  Hong ...................... A47L 5/365
                                                              55/343
2007/0079585 A1*  4/2007  Oh ........................ A47L 9/1625
                                                              55/345
(Continued)

FOREIGN PATENT DOCUMENTS

EP         1707273 A1    10/2006
EP         2140793 A1     1/2010
(Continued)

*Primary Examiner* — Andrew A Horton
(74) *Attorney, Agent, or Firm* — Birch, Stewart, Kolasch & Birch, LLP

(57) ABSTRACT

A dust collector for a vacuum cleaner disclosed herein includes a first cyclone that is configured to separate dust from air introduced from a lower portion thereof with containing foreign materials and discharge the separated dust into a first dust storing unit, a second cyclone that is configured to separate fine dust from the air, from which the dust has been separated by the first cyclone, and discharge the separated fine dust into a second dust storing unit defined in a second case, and a lower cover that is coupled to the first case by a hinge so as to define a bottom surface of the first dust storing unit, the second dust storing unit and the first cyclone upon being closed, and discharge therethrough the foreign materials collected in the first dust storing unit, the second dust storing unit and the first cyclone upon being open.

18 Claims, 6 Drawing Sheets

(51) Int. Cl.
*B04C 3/04* (2006.01)
*A47L 9/10* (2006.01)

(56) References Cited

U.S. PATENT DOCUMENTS

2007/0084160 A1* 4/2007 Kim .................... A47L 5/28
                                              55/345
2007/0084161 A1  4/2007 Yoo
2008/0023036 A1* 1/2008 Ha ..................... A47L 5/365
                                              134/21
2010/0205915 A1* 8/2010 Oh ..................... A47L 9/1625
                                              55/318

FOREIGN PATENT DOCUMENTS

| KR | 10-2007-0059299 A | 6/2007 |
| KR | 10-2009-0007912 A | 1/2009 |
| KR | 10-2013-0025794 A | 3/2013 |

* cited by examiner

DUST COLLECTOR FOR VACUUM CLEANER

CROSS-REFERENCE TO RELATED APPLICATION

Pursuant to 35 U.S.C. § 119(a), this application claims the benefit of earlier filing date and right of priority to Korean Application No. 10-2014-0135229, filed on Oct. 7, 2014, the contents of which is incorporated by reference herein in its entirety.

BACKGROUND OF THE DISCLOSURE

1. Field of the Disclosure

This specification relates to a dust collector for a vacuum cleaner, capable of separating and collecting dust from air introduced into the vacuum cleaner and easily discharging the collected dust through a multi-cyclonic method.

2. Background of the Disclosure

In general, a dust collector is an apparatus for collecting dust, such as hairs, dirt, and the like, contained in air using a cyclonic principle, and generally applied to vacuum cleaners.

To improve dust collecting efficiency, a multi-cyclone dust collector that a plurality of cyclones are connected is used in recent time.

Typically, the multi-cyclone dust collector includes an upstream cyclone and a downstream cyclone that is connected to the upstream cyclone and collects relatively small dust. Also, the downstream cyclone is often provided with a plurality of small cyclones.

Hereinafter, description will be given of a cyclone dust collector for a vacuum cleaner according to the related art.

The cyclone dust collector includes a first cyclone that primarily collects dust by sucking external polluted air, and a second cyclone that is connected to the first cyclone and secondarily collects fine dust. In a multi-cyclone type, the second cyclone is a set of a plurality of small cyclones.

The second cyclone corresponding to the plurality of small cyclones is installed along an outer circumference of the first cyclone. A first inlet through which external polluted air is introduced in a tangential direction is provided on a top of a first body of the first cyclone. A first outlet through which the air with the dust primarily separated therefrom is discharged toward the second cyclone is located approximately at a center in the first body of the first cyclone. The first outlet is typically formed in a cylindrical shape and has a structure with a lower portion open and an upper portion closed. In some cases, a filter is installed at the lower opening.

Meanwhile, the second cyclone corresponds to the plurality of small cyclones which are located along the outer circumference of the first cyclone. Of course, each second cyclone (i.e., each small cyclone) has a second inlet and a second outlet. Typically, a buffering space is defined between the first cyclone and the second cyclones, such that air drawn out of the first cyclone is introduced into the second cyclones via the buffering space. Also, a discharge space which communicates with the second outlets of the plurality of second cyclones is located at an upper part of the second cyclones. The air is externally discharged through a discharge pipe via the discharge space.

An operation of the related art multi-cyclone dust collector will now be described.

When a suction force generating element, for example, a suction fan of a vacuum cleaner is driven in response to an activation of the multi-cyclone dust collector, external polluted air is introduced into the first cyclone through the first inlet of the first cyclone. Here, the polluted air is introduced in a tangential direction, and orbits along an inner wall surface of the first body of the first cyclone. During the orbiting motion, dust is separated from the air by a centrifugal force.

Here, relatively heavy, large dust is collected on a bottom of the first cyclone, and small dust without being separated flows up while orbiting in the first cyclone and then is discharged through the first outlet.

Meanwhile, air containing fine dust, discharged from the first cyclone, is introduced into the second cyclones through the second inlets. Therefore, the fine dust is separated from the air again in the second cyclones, such that purified air is discharged to the outside sequentially through the second outlets, the discharge space and the discharge pipe.

However, the related art dust collector for the vacuum cleaner has the following problems.

When a filter is provided in the first cyclone, large dust, such as hairs, foreign materials and the like, has to be primarily filtered out by the filter and separated, and fine dust and air have to be introduced into the second cyclones through the filter. Afterwards, the fine dust is separated from the air in the second cyclones.

However, the large dust is stuck on the filter of the first cyclone and accordingly the filter fails to filter out and collect some of the large dust. Also, the dust stuck on the filter interferes with the flow of the fine dust. Consequently, the large dust and the fine dust are stuck and entangled on the filter.

Even when discharging dust by opening a cover of the dust collector, such dust stuck and entangled on the filter is uneasy to be separated from the filter. Also, the large dust stuck on the filter interferes with the flow of air, lowering overall efficiency of the vacuum cleaner.

Also, to externally discharge dust collected in the dust container, the first cyclone or a first or second dust storing unit should be individually detached from the dust collector, or a cover of the first cyclone or the first or second dust storing unit should be individually open. As a result, several processes are required for discharging the dust.

SUMMARY OF THE DISCLOSURE

Therefore, to solve those problems of the related art, an aspect of the detailed description is to provide a structure for efficiently separating dust stuck on a filter of a first cyclone, and a structure of a cover which forms (defines) a bottom surface of the first cyclone and first and second dust storing units.

To achieve these and other advantages and in accordance with the purpose of this specification, as embodied and broadly described herein, there is provided a dust collector for a vacuum cleaner, the dust collector including a first cyclone that is provided in a first case, and configured to separate dust from air introduced from a lower portion thereof with containing foreign materials and discharge the separated dust into a first dust storing unit, a second cyclone that is provided at at least one side of the first cyclone, and configured to separate fine dust from the air, from which the dust has been separated by the first cyclone, and discharge the separated fine dust into a second dust storing unit defined in a second case, and a lower cover that is coupled to the first case by a hinge so as to define a bottom surface of the first dust storing unit, the second dust storing unit and the first cyclone upon being closed, and discharge therethrough the foreign materials collected in the first dust storing unit, the second dust storing unit and the first cyclone upon being open.

In accordance with one exemplary embodiment disclosed herein, the first dust storing unit may be a space defined by an inner circumferential surface of the first case, an outer circumferential surface of the second case, an outer circumferential surface of the first cyclone and the lower cover, such that the dust discharged from the first cyclone is collected therein.

In accordance with another exemplary embodiment disclosed herein, the second case may be provided in the first case, and coupled to the second cyclone to accommodate a fine dust discharge opening of the second cyclone therein, such that the fine dust separated from the air by the second cyclone is collected therein.

The second dust storing unit may be a space defined by an outer circumferential surface of the second cyclone, an inner circumferential surface of the second case and the lower cover, such that the fine dust discharged from the second cyclone is collected therein.

In accordance with another exemplary embodiment disclosed herein, the first cyclone may include a mesh filter that is configured to separate the dust from the air in a filtering manner.

The mesh filter may be formed in a conic shape of getting narrower from top to bottom thereof, such that the dust filtered by the mesh filter and stuck on the mesh filter is separated from the mesh filter when the lower cover is open.

The mesh filter may be provided in the first cyclone and extend substantially in the same direction as an extending direction of the first cyclone.

The second case may extend substantially in the same direction as an extending direction of the first case.

The second case may be formed in a cylindrical or oval cylindrical shape, and disposed to come in contact with the outer circumferential surface of the first cyclone and the inner circumferential surface of the first case.

The second case may be provided by two, and the two second cases may be disposed to come in contact with the outer circumferential surface of the first cyclone and the inner circumferential surface of the first case, respectively.

In accordance with another exemplary embodiment disclosed herein, the second cyclone may extend substantially in the same direction as the extending direction of the first cyclone.

The second cyclone may be provided in plurality, and the plurality of second cyclones may extend in parallel with one another.

The plurality of second cyclones may be arranged to come in contact with the first cyclone or the first case.

To achieve these and other advantages and in accordance with the purpose of this specification, as embodied and broadly described herein, there is provided a vacuum cleaner including a main body that has a motor generating a rotational force, a suction part that is configured to suck air containing dust, and a dust collector that is configured to separate the dust from the air introduced into the suction part and discharge the separated dust, wherein the dust collector may include a first cyclone that is provided in a first case, and configured to separate dust from air introduced from a lower portion thereof with containing foreign materials and discharge the separated dust into a first dust storing unit, a second cyclone that is provided at at least one side of the first cyclone, and configured to separate fine dust from the air, from which the dust has been separated by the first cyclone, and discharge the separated fine dust into a second dust storing unit defined in a second case, and a lower cover that is coupled to the first case by a hinge so as to define a bottom surface of the first dust storing unit, the second dust storing unit and the first cyclone upon being closed, and discharge therethrough the foreign materials collected in the first dust storing unit, the second dust storing unit and the first cyclone upon being open.

A dust collector according to one exemplary embodiment disclosed herein may be provided with a lower cover defining a bottom surface of a first cyclone, and first and second dust storing units. This may allow for discharging dust collected in the first cyclone and the first and second dust storing units at once when the lower cover is open.

A dust collector according to another exemplary embodiment disclosed herein may be provided with a mesh filter which is provided in a first cyclone and has a conic shape of getting narrower from top to bottom thereof. This may allow for more efficiently separating and discharging large dust stuck on the mesh filter.

A dust collector according to another exemplary embodiment disclosed herein may have a structure that a second dust storing unit accommodates a fine dust discharge opening of a second cyclone, such that fine dust can be discharged into the second dust storing unit. This may result in improvement of dust collection performance of the fine dust. Also, the second cyclone may be located in a first case, which may result in more reduction of a size of the dust collector, compared with the related art dust collector in which a second cyclone is located above a first cyclone.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments disclosed herein to facilitate for the practice of those person skilled in the art to which the present disclosure belongs, with reference to the accompanying drawings. The present disclosure will be realized in different configurations, without being limited to those exemplary embodiments disclosed herein.

For the sake of brief description with reference to the drawings, the same or equivalent components will be provided with the same reference numbers, and description thereof will not be repeated. A singular representation may include a plural representation unless it represents a definitely different meaning from the context.

Figure 1:
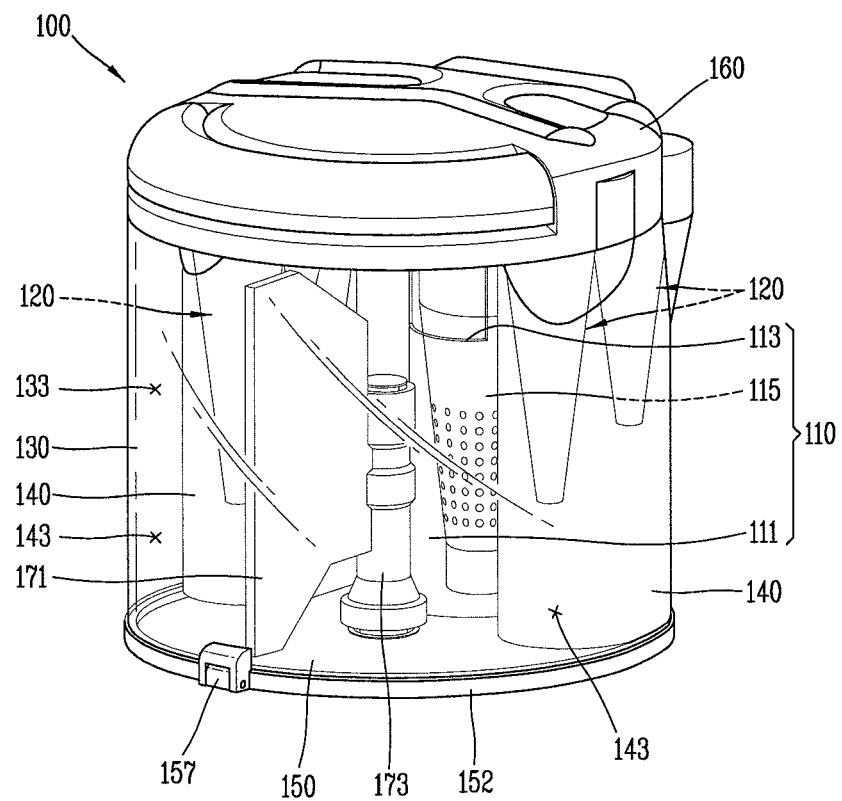
FIG. 1 is a perspective view of a dust collector for a vacuum cleaner in accordance with one exemplary embodiment disclosed herein.
Figure 2:
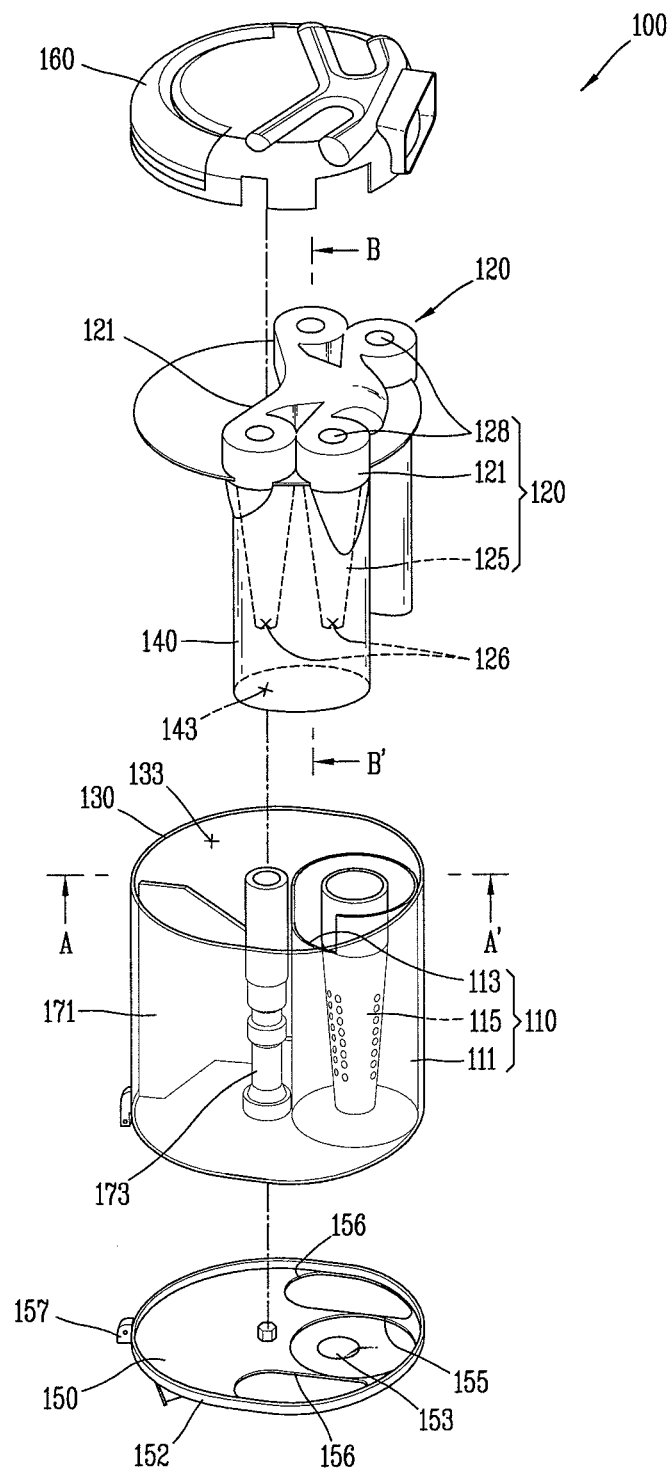
FIG. 2 is a conceptual view illustrating a part of the dust collector of FIG. 1 in a disassembled state.
Figure 3:
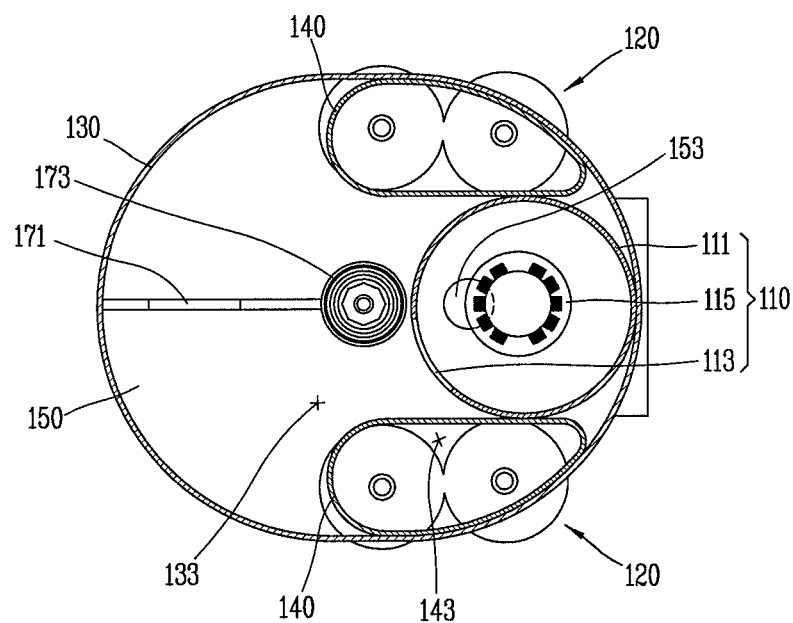
FIG. 3 is a sectional view taken along the line A-A' of FIG. 2.

FIG. 1 is a perspective view of a dust collector 100 for a vacuum cleaner in accordance with one exemplary embodiment disclosed herein, FIG. 2 is a conceptual view illustrating a part of the dust collector 100 of FIG. 1 in a disassembled state, and FIG. 3 is a sectional view taken along the line A-A' of FIG. 2.

As illustrated in FIGS. 1 to 3, the dust collector 100 for the vacuum cleaner may include a first cyclone 110, a second cyclone 120, a first case 130, a second case 140, and a lower cover 150.

The first cyclone 110 may primarily separate dust from air, which is introduced along with foreign materials through an introduction opening 153 formed through a bottom surface thereof, and discharge the separated dust into a first dust storing unit 133.

The first cyclone 110 may include a housing 111 and a mesh filter 115.

The housing 111 of the first cyclone 110 may be located within the first case 130. The housing 111 may be formed in a cylindrical shape such that dust can be separated and discharged from air using a centrifugal force.

For example, the housing 111 of the first cyclone 110 may extend substantially in the same direction as an extending direction of the first case 130, so as to form an appearance of the first cyclone 110. The housing 111 may allow air or dust introduced through a lower part thereof to orbit therein.

Also, a cutoff portion 113 may further be formed at an upper part of the housing 111, such that large dust can be discharged from the first cyclone 110 to the first dust storing unit 133 therethrough.

The mesh filter 115 of the first cyclone 110 filters out the large dust from the introduced air.

In order for the air passed through the mesh filter 115 to flow up along an introduction passage 122 of the second cyclone 120, which will be explained later, and be introduced into the second cyclone 120 through an inlet 123, an upper portion of the mesh filter 115 is connected to the introduction passage 122 of the second cyclone 120.

The mesh filter 115 may be formed in a manner of extending substantially in the same direction as the extending direction of the first cyclone 110, and formed in a conic shape of getting narrower from top to bottom thereof. The structure of the mesh filter 115 may more facilitate dust, which is stuck on the mesh filter 115, to be separated from the mesh filter 115 when the lower cover 150 is open.

The first case 130 may be formed in a cylindrical shape, for example. The first case 130 may accommodate therein the first cyclone 110, the second cyclone 120, the second case 140 and the compression plate 171. A partial inner space of the first case 130 may define a first dust storing unit 133.

The first dust storing unit 133 is a space in which relatively large dust discharged from the first cyclone 110 is collected. The first dust storing unit 133, for example, may be defined by an inner circumferential surface of the first case 130, an outer circumferential surface of the second case 140, an outer circumferential surface of the first cyclone 110 and the lower cover 150.

The first case 130 is formed in a cylindrical shape, which may define a part of the appearance of the dust collector 100. A casing (not illustrated) may further be provided at an outside of the first case 130 so as to define the part of the appearance of the dust collector 100. The first case 130 or the casing (not illustrated) may be formed transparent such that an amount of dust collected in the first dust storing unit 133 is visible.

The compression plate 171 for compressing dust may be rotatably provided in the first case 130. The compression plate 171 may compress the dust collected in the first dust storing unit 133. Accordingly, an increased space may be ensured in the first dust storing unit 133 and thus more dust may be collected.

The compression plate 171 may compress dust by rotating in one direction centering on a central shaft 173. When its rotation in the one direction is interrupted due to foreign materials or large dust during the rotation, the compression plate 171 may switch the rotating direction to rotate in a reverse direction.

The second cyclone 120 secondarily separates fine dust from the air, which has been introduced sequentially through the upper portion of the mesh filter 115 and the inlet 123 of the second cyclone 120, and discharges the separated fine dust. That is, the second cyclone 120 secondarily separates fine dust from the air, from which the relatively large dust has been separated by the first cyclone 110, and then discharges the separated fine dust. The discharged fine dust is collected into a second dust storing unit 143 which is a space defined in the second case 140.

The second cyclone 120 is located at at least one side of the first cyclone 110 and extends substantially in the same direction as the extending direction of the first cyclone 110. For example, the second cyclone 120 may extend perpendicular to a bottom surface of the first cyclone 110.

In order for the fine dust, which has been separated and discharged from the second cyclone 120, to be more efficiently collected in the second dust storing unit 143 without being scattered to outside, a fine dust discharge opening 126 which is formed at an end portion of a fine dust discharge pipe 125 of the second cyclone 120 has a structure of being accommodated in the second case 140. A detailed structure of the second cyclone 120 will be explained later.

The second case 140 may be formed in a cylindrical or oval cylindrical shape. In addition to the cylindrical shape, the second case 140 may have various shapes suitable for collecting the fine dust therein.

The second case 140 may be provided in the first case 130 and arranged to come in contact with an outer circumferential surface of the first cyclone 110 and an inner circumferential surface of the first case 130. Also, the second case 140 may extend substantially in the same direction as the extending direction of the first case 130. The second case 140 may be formed in a cylindrical or oval cylindrical shape, for example.

Also, the second case 140 may be provided by two. Each of the two second cases 140 may be arranged to come in contact with the outer circumferential surface of the first cyclone 110 and the inner circumferential surface of the first case 130.

Meanwhile, the second case 140 is coupled to the fine dust discharge pipe 125 of the second cyclone 120 so as to accommodate the fine dust discharge opening 126 therein. This structure is advantageous in that the fine dust discharged through the fine dust discharge opening 126 is collected in the second dust storing unit 143.

The second dust storing unit 143 is a space in which the fine dust discharged from the second cyclone 120 is collected. The second dust storing unit 143, for example, may be defined by the inner circumferential surface of the second case 140, the outer circumferential surface of the second cyclone 120 and the lower cover 150.

The second cyclone 120, as will be explained later, may be provided in plurality. Here, the second case 140 may have a structure of being coupled to the fine dust discharge pipes 125 of the plurality of second cyclones 120, respectively.

The dust collector 100 according to the one exemplary embodiment disclosed herein may be advantageous in view of collection and discharge of fine dust, packaging of internal components of the dust collector, and improvement of dust collection and discharge efficiency, by virtue of the arrangement of the second case 140 and the coupling between the second case 140 and the second cyclone 120 within the first case 130.

Meanwhile, an upper casing 160 may be coupled to the first case 130 or an outer casing (not illustrated) of the first case 130.

The lower cover 150 may be coupled to the first case 130 by a hinge 157 so as to open and close the first case 130. The lower cover 150 defines a bottom surface of the first dust storing unit 133, the second dust storing unit 143 and the first cyclone 110 when it is closed.

For example, the lower cover 150 may be formed in a shape of a thin plate, or be implemented into various shapes suitable for closing the bottom surface of the first dust storing unit 133, the second dust storing unit 143 and the first cyclone 110.

The lower cover 150 may be provided with a plurality of sealing members 152, 155 and 156 for sealing lower portions of the first case 130, the second case 140 and the first cyclone 110.

An introduction opening 153 may be formed through the bottom surface of the first cyclone 110 of the lower cover 150. Dust containing foreign materials may be introduced into the first cyclone 110 through the introduction opening 153.

Figure 4:
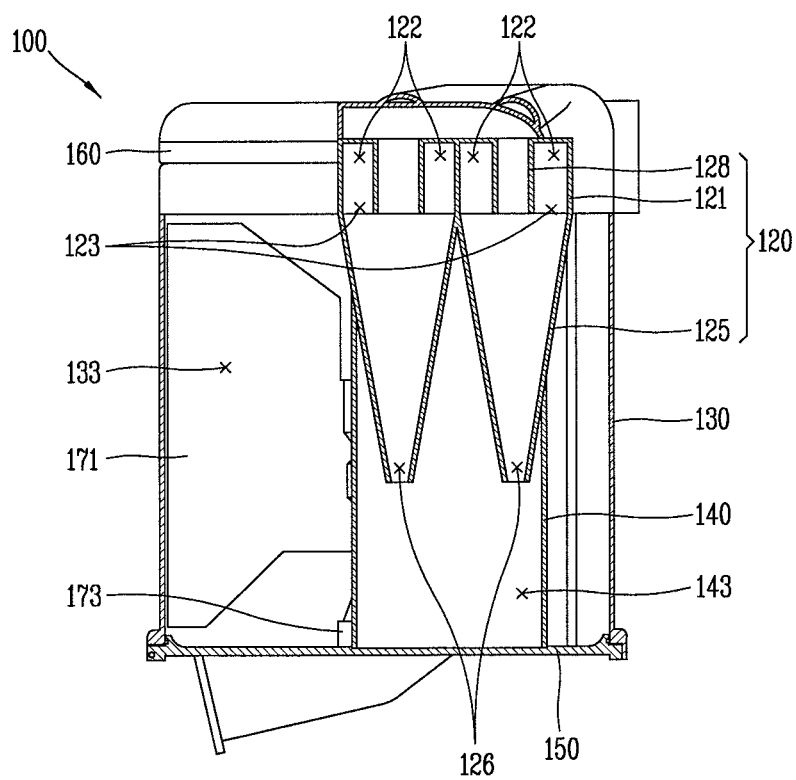
FIG. 4 is a sectional view taken along the line B-B' of FIG. 2.

FIG. 4 is a sectional view taken along the line B-B' of FIG. 2.

Hereinafter, a structure of the second cyclone 120 will be described with reference to FIGS. 2 and 4.

The second cyclone 120 may include an introduction sidewall 121, a fine dust discharge pipe 125, and an air discharge pipe 128.

The inlet 123 through which air containing fine dust is introduced is formed at a portion where the introduction sidewall 121 and the fine dust discharge pipe 125 of the second cyclone 120 come in contact with each other. Air flowed through the mesh filter 115 may be introduced into the second cyclone 120 through the inlet 123.

The introduction passage 122 is configured such that air passed through the first cyclone 110 is introduced into the second cyclone 120 therethrough. The introduction passage 122 may be a space which is defined by the introduction sidewall 121 and an upper surface (not illustrated). The introduction sidewall 121 may include various curved surfaces, such as a circular surface, a semicircular surface and the like.

The fine dust discharge pipe 125 is formed in a shape of a conic pipe of getting narrower in a discharging direction of the fine dust. Accordingly, the fine dust may be separated from the air and discharged through the fine dust discharge pipe 125.

The air discharge pipe 128 is a pipe for externally discharging therethrough air from which the fine dust has been separated by the second cyclone 120, and may be formed in a cylindrical shape.

The second cyclone 120 may be provided in plurality. The plurality of second cyclones 120 may extend in parallel with one another. The plurality of second cyclones 120 may be arranged to come in contact with the first cyclone 110 or the first case 130. Referring to FIG. 3, four second cyclones 120 are arranged in two pairs at both sides of the first cyclone 110.

The second cyclone 120 has the fine dust discharge pipe 125 with the structure of getting narrower and is provided in plurality, thereby implementing a structure of more effectively separating and discharging the fine dust.

Figure 5:
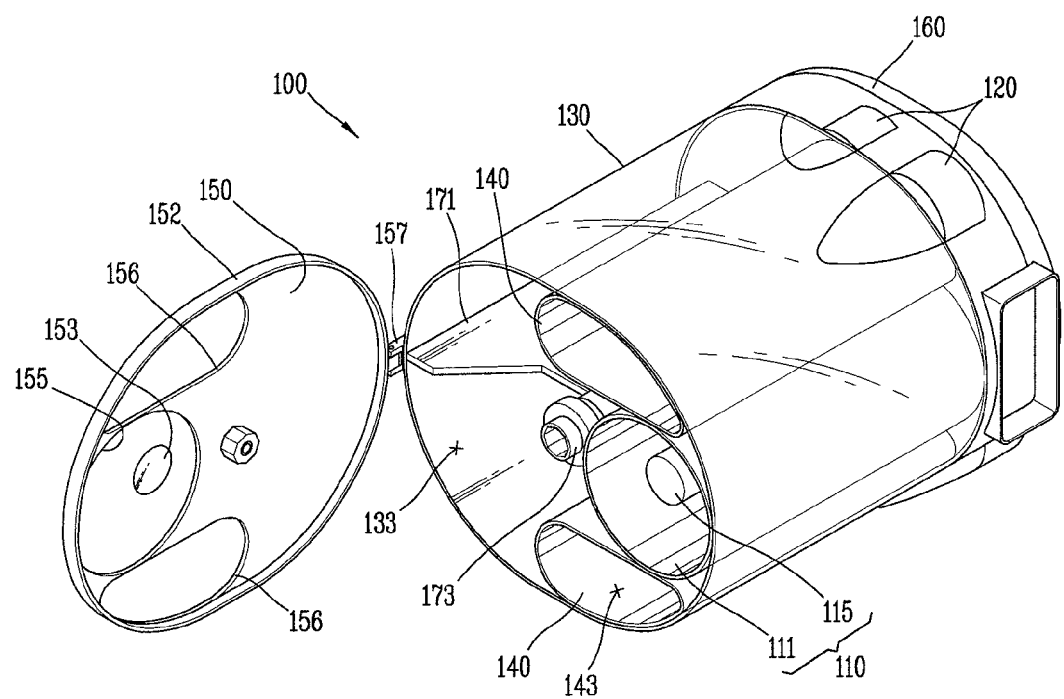
FIG. 5 is a conceptual view illustrating the dust collector of FIG. 1 with a lower cover open.

FIG. 5 is a conceptual view illustrating the dust collector 100 of FIG. 1 with the lower cover 150 open.

Hereinafter, description will be given of a process of externally discharging dust from the first cyclone 110 and the first and second dust storing units 133 and 143, with reference to FIG. 5.

When a predetermined amount of dust is collected in the first cyclone 110 and the first and second dust storing units 133 and 143, a user of the vacuum cleaner opens the lower cover 150 and discharges the collected dust to the outside.

The lower cover 150 is coupled to the first case 130 by the hinge 157, so as to be open in a manner of rotating centering on the hinge 157. In response to the lower cover 150 being open, dust stuck on the mesh filter 115 of the first cyclone 110 and dust collected in the first and second dust storing units 133 and 143 are externally dischargeable.

As aforementioned, since the lower cover 150 forms the bottom surface of the first cyclone 110 and the first and second dust storing units 133 and 143, the dust stuck on the mesh filter 115 of the first cyclone 110 and the dust collected in the first and second dust storing units 133 and 143 may be discharged out of the dust collector 110 at once merely by opening the lower cover 150.

The related art dust collector has a disadvantage in that the first cyclone or the first and second dust storing units should be individually separated from the dust collector or a cover of the first cyclone or the first and second dust storing units should be individually open to externally discharge dust collected in the dust collector.

However, the dust collector 100 according to the one exemplary embodiment disclosed herein has the advantage in view of discharging the dust collected in the first and second dust storing units 133 and 143 and the dust stuck on the mesh filter 115 of the first cyclone 110 at once merely by opening the lower cover 150.

Figure 6:
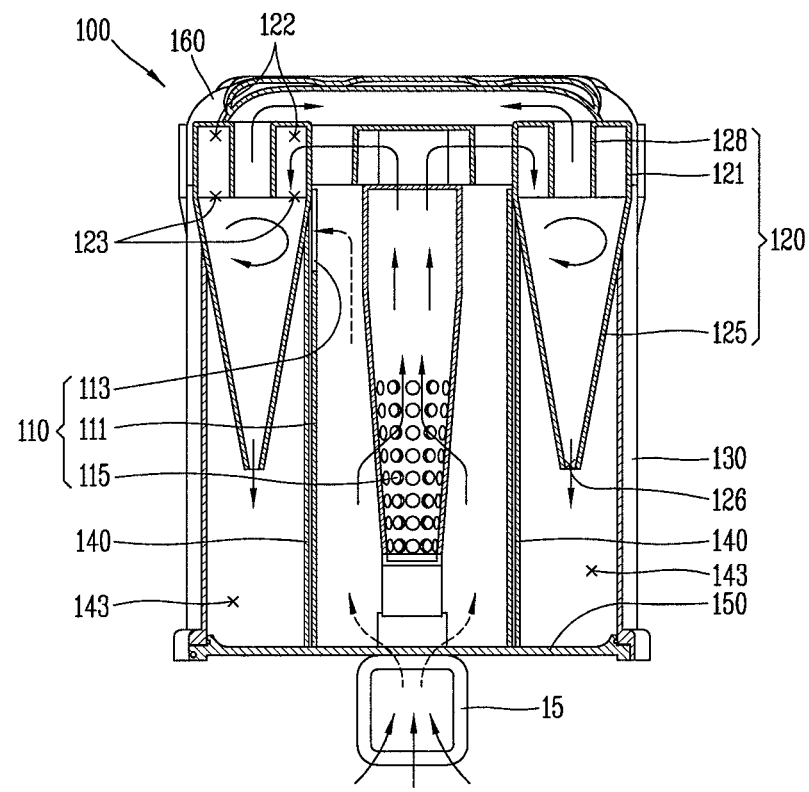
FIG. 6 is a conceptual view illustrating the flow of air or dust in a first cyclone and a second cyclone.
Figure 7:
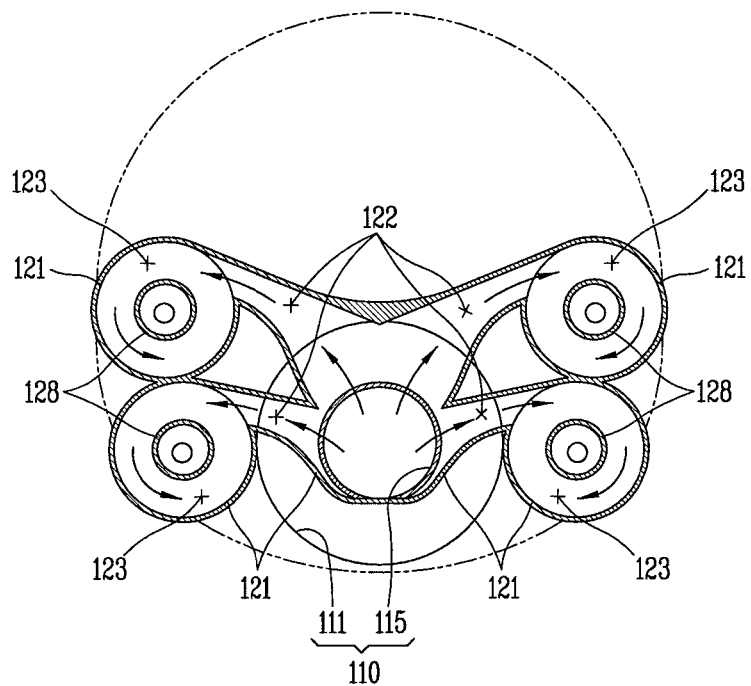
FIG. 7 is a conceptual view illustrating the flow of air or dust, which flows through an upper portion of the first cyclone and is introduced into the second cyclone.

FIG. 6 is a conceptual view illustrating the flow of air or dust in the first cyclone 110 and the second cyclones 120, and FIG. 7 is a conceptual view illustrating the flow of air or dust which passes through the upper portion of the first cyclone 110 and is introduced into the second cyclone 120.

Hereinafter, description will be given of a process in which external air containing foreign materials is introduced into the dust collector 100 and dust and fine dust are separated from the air, with reference to FIGS. 6 and 7.

The vacuum cleaner sucks external air containing foreign materials through a suction part 310 during a cleaning operation. The sucked air is introduced into a lower portion of the first cyclone 110 through a lower introduction pipe 15. The air introduced into the first cyclone 110 flows upward with performing an orbiting motion. During this process, the foreign materials, such as hairs, large dust and the like, are stuck (entangled) on the mesh filter 115 or collected into the first dust storing unit 133 by being discharged through the cutoff portion 113 of the first cyclone 110 with failing to pass through the mesh filter 115.

Some of the fine dust and the air are discharged through an upper portion of the mesh filter 115, flow along the introduction passage 122 and are introduced into the second cyclone 120 through the inlet 123. FIG. 7 exemplarily illustrates that fine dust and air discharged through the upper portion of the mesh filter 115 are introduced into the four second cyclones 120 sequentially through the introduction passages 122 and the inlets 123.

The air introduced into the second cyclone 120 orbits in the second cyclone 120. During the orbiting motion, the fine dust is discharged through the fine dust discharge pipe 125 and the air is discharged out of the dust collector 100 through the air discharge pipe 128.

The fine dust discharged through the fine dust discharge opening 126 is collected into the second dust storing unit 143 which accommodates the fine dust discharge opening 126 therein. The fine dust discharge opening 126 extends downward, and the second case 140 is coupled to the fine dust discharge pipe 125. This structure may allow the fine dust to be more efficiently collected into the second dust storing unit 143.

Figure 8:
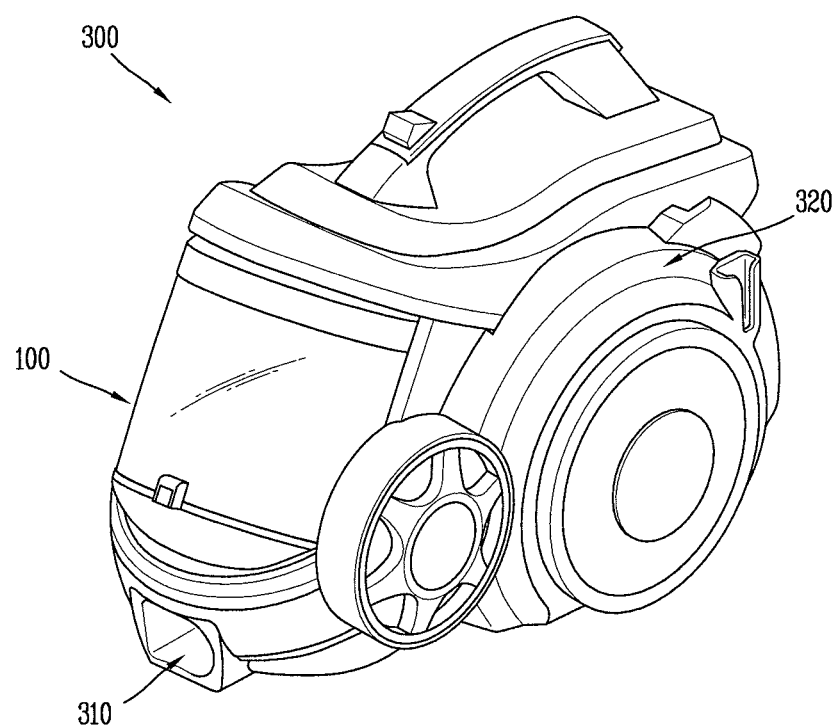
FIG. 8 is a conceptual view of a vacuum cleaner having the dust collector according to the one exemplary embodiment disclosed herein.

FIG. 8 is a conceptual view of a vacuum cleaner 200 having the dust collector 100 according to the one exemplary embodiment disclosed herein.

As illustrated in FIG. 8, the vacuum cleaner 200 includes a main body 220, a suction part 210, and a dust collector 100.

The main body 220 is provided with a power supply unit, a motor and the like generating a rotational force, so as to generate a suction force for sucking up air containing dust when the vacuum cleaner is driven.

The suction part 210 sucks air contained dust into the dust collector 100 using the suction force generated in the main body 220.

The dust collector 100 separates the dust from the air introduced from the suction part 210 and discharge the separated dust. The dust collector 100 has been aforementioned in detail, so description thereof will be omitted.

The configurations and methods of the dust collector for the vacuum cleaner in the aforesaid embodiments may not be limitedly applied, but such embodiments may be configured by a selective combination of all or part of the embodiments so as to implement many variations.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A dust collector for a vacuum cleaner, the dust collector comprising:
a first case having a first dust storing unit in the first case;
a first cyclone eccentrically provided in the first case to be in contact with an inner circumferential surface of the first case, the first cyclone being configured to separate dust from air introduced into the first cyclone and discharge the separated dust into the first dust storing unit;
two second cases provided on both sides of the first cyclone and contacting an outer circumferential surface of the first cyclone and the inner circumferential surface of the first case, at least one of the second cases having a second dust storing unit therein;
a second cyclone disposed inside one of the second cases, the second cyclone being configured to separate fine dust from the air introduced into the second cyclone from the first cyclone and discharge the separated fine dust into the second dust storing unit;
a lower cover being coupled to the first case so as to open and close the first case, in response to the lower cover being open, dust collected in the first cyclone, the first and second dust storing units being externally dischargeable;
a central shaft rotatably coupled to the first cyclone;
a rotary member rotatably installed at the lower cover and disposed at a position corresponding to the central shaft so as to engage with or disengage from the central shaft according to opening and closing of the lower cover, the rotary member having a shape corresponding to a part of the central shaft to be rotated together with the central shaft; and
a compression plate coupled to the central shaft and rotating in one direction and in a reverse direction within a rotation range defined by the two second cases so as to compress the dust collected in the first dust storing unit,
wherein the first case, the first cyclone, the two second cases and the second cyclone are arranged at the same height, and are arranged to extend toward the height direction of the dust collector.

2. The dust collector of claim 1, wherein the lower cover defines a bottom surface of the first dust storing unit, the second dust storing unit and the first cyclone when it is closed.

3. The dust collector of claim 2, wherein an introduction opening formed through the bottom surface of the first cyclone, wherein the air is introduced into the first cyclone from a lower portion of the first cyclone through the introduction opening.

4. The dust collector of claim 1, wherein the first dust storing unit is a space defined by the inner circumferential surface of the first case, an outer circumferential surface of one of the second cases, the outer circumferential surface of the first cyclone and an inner surface of the lower cover, such that the dust discharged from the first cyclone is collected therein.

5. The dust collector of claim 1, wherein one of the second cases is provided in the first case, the one of the second cases being coupled to the second cyclone to accommodate a fine dust discharge opening of the second cyclone in the one of the second cases.

6. The dust collector of claim 5, wherein the second dust storing unit is a space defined by an outer circumferential surface of the second cyclone, an inner circumferential surface of the one of the second cases and an inner surface of the lower cover, such that the fine dust discharged from the second cyclone is collected therein.

7. The dust collector of claim 5, wherein the second cyclone comprises a plurality of second cyclones extending in parallel with one another, and wherein the plurality of second cyclones contact at least one of the first cyclone and the first case.

8. The dust collector of claim 5, wherein the one of the second cases is formed in a circular cylindrical or oval cylindrical shape.

9. The dust collector of claim 1, wherein one of the second cases extends substantially in a same direction as an extending direction of the first case.

10. The dust collector of claim 1, wherein the first cyclone comprises:
a mesh filter configured to separate the dust from the air in a filtering manner; and
a housing extending substantially in a same direction as an extending direction of the first case, so as to form an appearance of the first cyclone, and allowing the air or dust to orbit therein,
wherein an outer circumferential surface of one of the second cases is arranged to come in contact with an outer circumferential surface of the housing.

11. The dust collector of claim 10, wherein an upper portion of the mesh filter is connected to an introduction passage of the second cyclone such that air that has passed through the mesh filter is introduced into the second cyclone.

12. The dust collector of claim 10, wherein the mesh filter is formed in a conic shape that becomes narrower from a top of the mesh filter to a bottom of the mesh filter, such that the dust filtered by the mesh filter and stuck on the mesh filter is separated from the mesh filter when the lower cover is open.

13. The dust collector of claim 12, wherein the mesh filter is provided in the first cyclone and extends substantially in the same direction as the extending direction of the first case.

14. The dust collector of claim 1, wherein the second cyclone extends substantially in a same direction as an extending direction of the first cyclone.

15. The dust collector of claim 1, wherein the first dust storing unit is a space defined by the inner circumferential surface of the first case, an outer circumferential surface of one of the second cases, the outer circumferential surface of the first cyclone and an inner surface of the lower cover, such that the dust discharged from the first cyclone is collected therein, and
wherein the second dust storing unit is a space defined by an outer circumferential surface of the second cyclone, an inner circumferential surface of the one of the second cases and an inner surface of the lower cover, such that the fine dust discharged from the second cyclone is collected therein.

16. A vacuum cleaner comprising:
a main body configured to generate a suction force;
a suction part configured to suck air containing dust; and
a dust collector configured to separate the dust from the air introduced into the suction part and discharge the separated dust, wherein the dust collector comprises:
a first case having a first dust storing unit in the first case;
a first cyclone eccentrically provided in the first case to be in contact with an inner circumferential surface of the first case, the first cyclone being configured to separate dust from air introduced into the first cyclone and discharge the separated dust into the first dust storing unit;
two second cases provided on both sides of the first cyclone and contacting an outer circumferential surface of the first cyclone and the inner circumferential surface of the first case, at least one of the second cases having a second dust storing unit therein;
a second cyclone disposed inside one of the second cases, the second cyclone being configured to separate fine dust from the air introduced into the second cyclone from the first cyclone and discharge the separated fine dust into the second dust storing unit; and
a lower cover being coupled to the first case so as to open and close the first case, in response to the lower cover being open, dust collected in the first cyclone, the first and second dust storing units being externally dischargeable;
a central shaft rotatably coupled to the first cyclone;
a rotary member rotatably installed at the lower cover and disposed at a position corresponding to the central shaft so as to engage with or disengage from the central shaft according to opening and closing of the lower cover, the rotary member having a shape corresponding to a part of the central shaft to be rotated together with the central shaft; and
a compression plate coupled to the central shaft and rotating in one direction and in a reverse direction within a rotation range defined by the two second cases so as to compress the dust collected in the first dust storing unit,
wherein the first case, the first cyclone, the two second cases and the second cyclone are arranged at the same height, and are arranged to extend toward the height direction of the dust collector.

17. The vacuum cleaner of claim 16, wherein the first cyclone comprises a mesh filter configured to separate the dust from the air in a filtering manner, and
wherein an upper portion of the mesh filter is connected to an introduction passage of the second cyclone such that air that has passed through the mesh filter is introduced into the second cyclone.

18. The vacuum cleaner of claim 17, wherein the first dust storing unit is a space defined by the inner circumferential surface of the first case, an outer circumferential surface of one of the second cases, the outer circumferential surface of the first cyclone and an inner surface of the lower cover, such that the dust discharged from the first cyclone is collected therein,
wherein the second dust storing unit is a space defined by an outer circumferential surface of the second cyclone, an inner circumferential surface of the one of the second cases and the inner surface of the lower cover, such that the fine dust discharged from the second cyclone is collected therein, and
wherein the second cyclone comprises two second cyclones extending in parallel with one another.

* * * * *